(12) United States Patent
Feng et al.

(10) Patent No.: US 8,906,338 B2
(45) Date of Patent: Dec. 9, 2014

(54) METHOD FOR MAKING CARBON NANOTUBE FILM

(75) Inventors: Chen Feng, Beijing (CN); Kai-li Jiang, Beijing (CN); Liang Liu, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 46 days.

(21) Appl. No.: 12/592,879

(22) Filed: Dec. 3, 2009

(65) Prior Publication Data

US 2010/0270704 A1  Oct. 28, 2010

(30) Foreign Application Priority Data

Apr. 22, 2009  (CN) .......................... 2009 1 0107112

(51) Int. Cl.
*D01F 9/12* (2006.01)
*D01F 9/127* (2006.01)
*B82Y 30/00* (2011.01)

(52) U.S. Cl.
CPC ............. *B82Y 30/00* (2013.01); *C01B 2202/08* (2013.01)
USPC ................................... 423/447.1; 423/447.3

(58) Field of Classification Search
USPC .......................................... 423/447.1–447.3
See application file for complete search history.

(56) References Cited

U.S. PATENT DOCUMENTS

| 8,668,896 B2* | 3/2014 | Liu et al. ..................... 423/447.1 |
| 2006/0134326 A1 | 6/2006 | Watanabe et al. |
| 2007/0237959 A1* | 10/2007 | Lemaire ...................... 428/408 |
| 2008/0170982 A1* | 7/2008 | Zhang et al. ................ 423/447.3 |
| 2008/0246173 A1* | 10/2008 | Braidwood et al. ............ 264/28 |
| 2009/0092813 A1 | 4/2009 | Lin et al. |

FOREIGN PATENT DOCUMENTS

| CN | 101239712 | 8/2008 |
| CN | 101409999 | 4/2009 |
| JP | 2008523254 | 7/2008 |
| TW | 200813414 | 3/2008 |
| TW | 200833862 | 8/2008 |
| WO | WO2007099975 | 9/2007 |

OTHER PUBLICATIONS

Definition of "line," accessed online at: http://dictionary.reference.com/brose/line on May 8, 2014.*
Definition of "plane," accessed online at http://www.merriam-webster.com/dictionary/plane.*

(Continued)

*Primary Examiner* — Daniel C McCracken
(74) *Attorney, Agent, or Firm* — Novak Druce Connolly Bove + Quigg LLP

(57) ABSTRACT

A method for making a carbon nanotube film is provided. In the method, a carbon nanotube array is grown on a substrate, and a rigid drawing device is provided. The carbon nanotube array is adhered to the rigid drawing device via an planar adhesive region of the rigid drawing device. The rigid drawing device is pulled at a speed along a direction away from the substrate, thereby pulling out a continuous carbon nanotube film. The carbon nanotube array includes a plurality of carbon nanotubes. The planar adhesive region have a linear border, wherein the linear border of the planar adhesive region is the closest border of the planar adhesive region to a surface of the substrate. The carbon nanotubes in the carbon nanotube array are adhered via the planar adhesive region.

15 Claims, 6 Drawing Sheets

--- providing a carbon nanotube array grown on a substrate and a rigid drawing device, which includes a planar adhesive region

↓ adhering the carbon nanotube array to the rigid drawing device via the planar adhesive region, wherein the planar adhesive region has a linear border, the linear border is parallel to the substrate and is the closest border of the planar adhesive region to the substrate

↓ pulling the rigid drawing device, at a speed, along a direction away from the substrate, thereby pulling out a continuous carbon nanotube film

(56) References Cited

OTHER PUBLICATIONS

Definition of gradually, accessed online at http://www.merriam-webster.com/thesaurus/gradually on Aug. 7, 2014.*

Definition of always, accessed online at http://www.merriam-webster.com/dictionary/always on Aug. 7, 2014.*

"Helical microtubules of graphitic carbon", Sumio Iijima, Nature, vol. 354, p. 56(1991).

* cited by examiner

METHOD FOR MAKING CARBON NANOTUBE FILM

RELATED APPLICATIONS

This application is related to copending application Ser. No. 12/002,129, filed Dec. 14, 2007, entitled, "CARBON NANOTUBE FILM STRUCTURE AND METHOD FOR FABRICATING THE SAME," and application Ser. No. 12/592,884, filed Dec. 3, 2009, entitled, "METHOD AND DEVICE FOR FABRICATING CARBON NANOTUBE FILM."

BACKGROUND

1. Technical Field

The present disclosure relates to a method for making carbon nanotube film.

2. Description of Related Art

Carbon nanotubes (CNTs) are a novel carbonaceous material and have received a great deal of interest since the early 1990s. Carbon nanotubes have interesting and potentially useful electrical and mechanical properties. Due to these and other properties, carbon nanotubes have become an important new material for use in a variety of fields. However, the acquired carbon nanotubes are generally in a form of particles or powder and that is inconvenient for applications.

Currently, different methods are widely used for fabricating carbon nanotube films including a growing method, a spraying method, and a Langmuir-Blodgett (LB) method. In the growing method, a carbon nanotube film is grown on a substrate by using a chemical vapor deposition (CVD). Multiple catalyst layers are formed on the substrate and reaction conditions of the CVD is controlled. In the spraying method, carbon nanotubes, dispersed in a solvent, are sprayed on a substrate, and the solvent is dried to form a carbon nanotube film. In the LB method, carbon nanotubes are dispersed in a solvent to form a solution, and another solution having a different density is mixed with the carbon nanotube solution, thereby causing the carbon nanotubes to float on the surface of the mixture to form a carbon nanotube film.

However, the carbon nanotube film manufactured by the growing method is not a free standing film. The thickness of the carbon nanotube film manufactured by the spraying method is not uniform. Carbon nanotubes in the carbon nanotube film acquired by the LB method are disorderly aligned.

Referring to FIG. 6, a conventional method for making the carbon nanotube film, according to the prior art, includes: (a) providing a carbon nanotube array 12; (b) pulling out a carbon nanotube film 14 from the carbon nanotube array 12 by using an adhesive tape. In step (b), the carbon nanotube array 12 is contacted by the adhesive tape, and the adhesive tape is moved at a speed along a direction substantially perpendicular to a growth orientation of carbon nanotubes, thereby drawing a carbon nanotube film 14 from the carbon nanotube array 12. The carbon nanotubes in the carbon nanotube film 14 can be distributed uniformly and aligned orderly. However, the adhesive tape is soft, a flat contacting surface between the carbon nanotube array 12 and the adhesive tape cannot be easily formed. Therefore, the carbon nanotubes cannot be firmly adhered on the contact surface, during the drawing process some of the carbon nanotubes may detach from the adhesive tape, the carbon nanotubes contacted with the adhesive tape cannot be simultaneously pulled off from the substrate. Thus, a discontinuous spot 16 can be appeared in the carbon nanotube array 12, and a nonuniform thickness or a gap can be formed in the carbon nanotube film 14. The discontinuous spot 16 can be a small inflexion which appears in a boundary between the carbon nanotube array 12 and the carbon nanotube film 14 when the carbon nanotubes adhered by the adhesive tape are not synchronously pulled away from the substrate.

What is needed, therefore, is to provide a method for making a more continuous and uniform carbon nanotube film.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
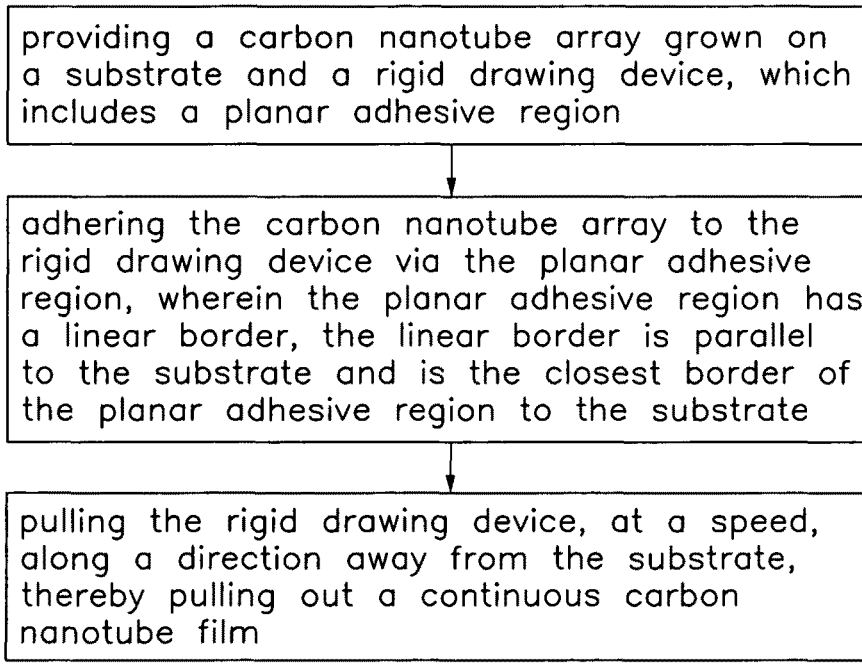
FIG. 1 is a flow chart of one embodiment of a method for making a carbon nanotube film.
Figure 2:
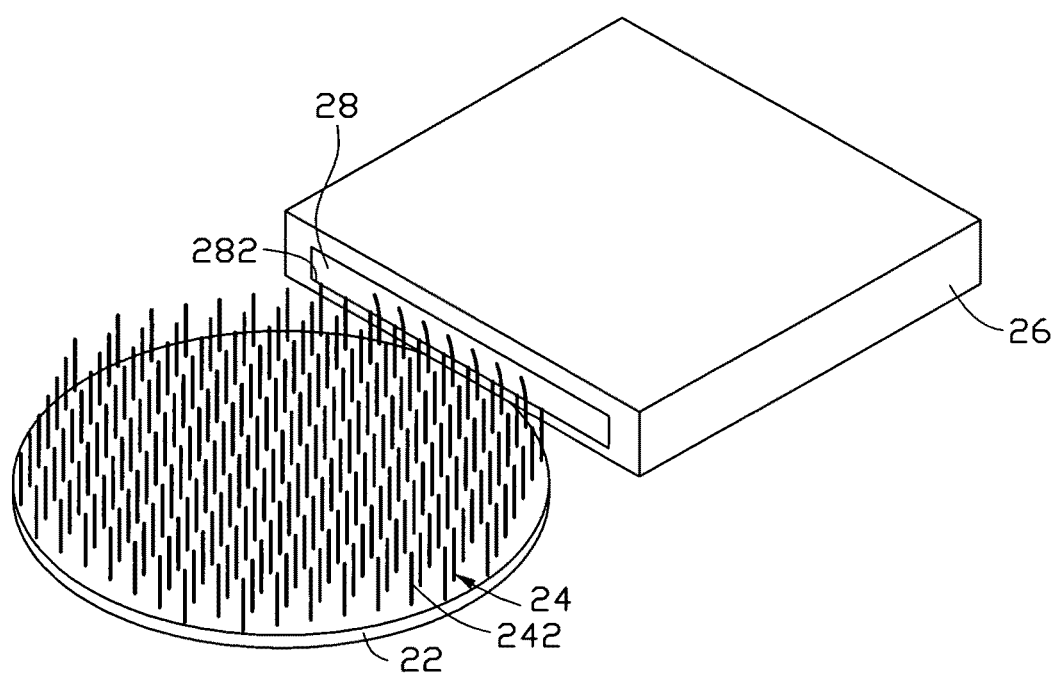
FIG. 2 is a schematic view of the method of FIG. 1.
Figure 3:
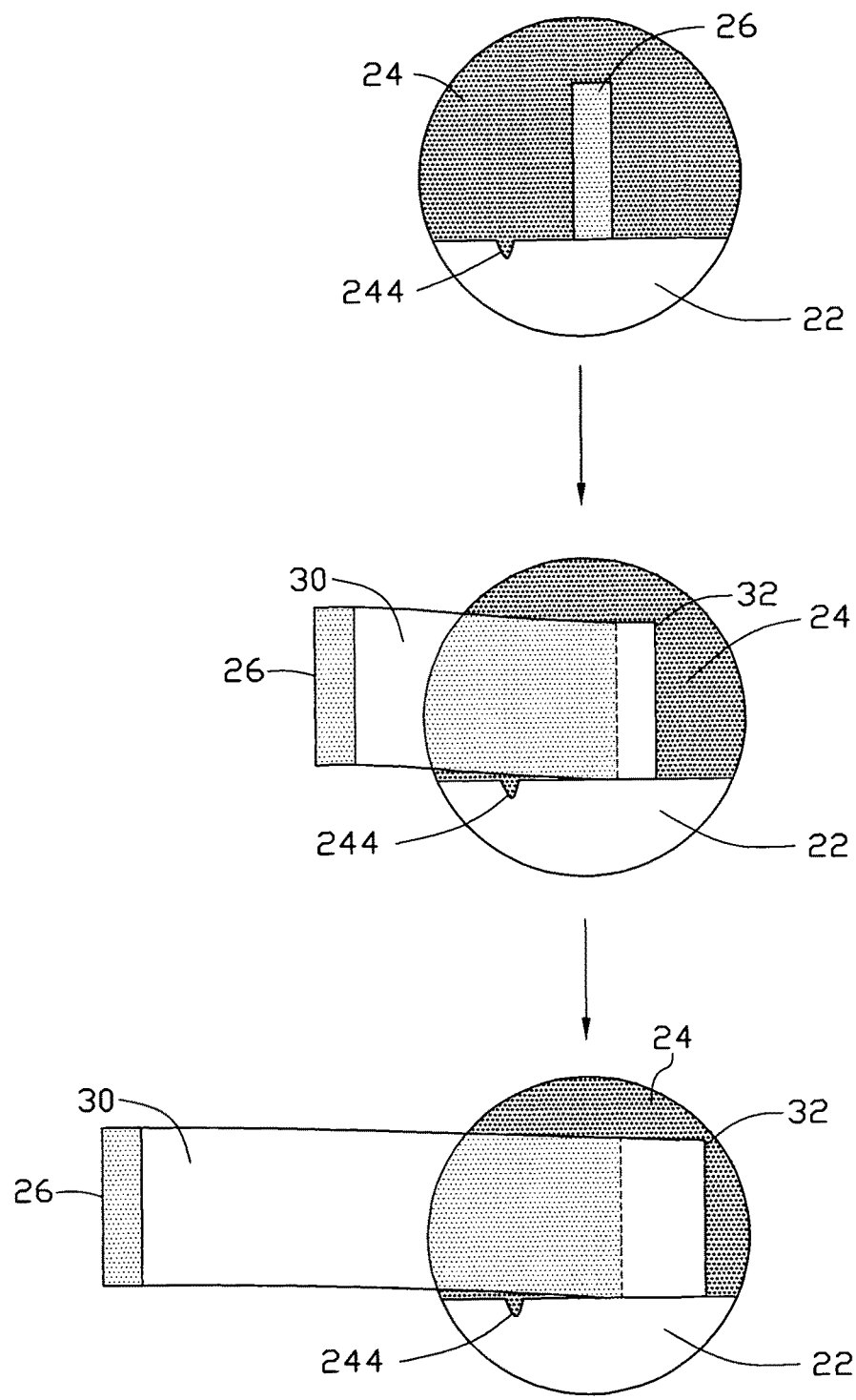
FIG. 3 is a schematic view of avoiding a discontinuous spot in the carbon nanotube array during making the carbon nanotube film.

Referring to FIGS. 1, 2 and 3, a method for making a carbon nanotube film includes:

(a) providing a carbon nanotube array 24 grown on a substrate 22 and a rigid drawing device 26, which includes a planar adhesive region 28;

(b) adhering the carbon nanotube array 24 to the rigid drawing device 26 via the planar adhesive region 28, wherein the planar adhesive region 28 has a linear border 282, the linear border 282 is parallel to the substrate 22 and is the closest border of the planar adhesive region 28 to the substrate 22; and (c) pulling the rigid drawing device 26, at a speed, along a direction away from the substrate 22, thereby pulling out a continuous carbon nanotube film 30.

In step (a), the carbon nanotube array 24 can be a super-aligned carbon nanotube array, and the super-aligned carbon nanotube array 24 can be made by a chemical vapor deposition (CVD) method. The carbon nanotube array 24 includes a plurality of carbon nanotubes 242 parallel to each other, and the carbon nanotubes 242 are substantially perpendicular to the substrate 22. The carbon nanotubes 242 can be single-walled, double-walled, or multi-walled carbon nanotubes. In one embodiment, the carbon nanotubes 242 are multi-walled carbon nanotube, and the carbon nanotube array 24 is substantially free of impurities such as amorphous carbon or catalyst particles.

The rigid drawing device 26 has a fixed configuration and cannot be easily deformed by external forces. The rigid drawing device 26 can be made of a rigid material such as iron, glass, ceramics, or rigid plastic. The rigid drawing device 26 may be made of steel or glass. The planar adhesive region 28 of the rigid drawing device 26 can be formed by coating an adhesive on a side surface of the rigid drawing device 26. The planar adhesive region 28 is an adhesive plane. The planar adhesive region 28 is oriented towards the carbon nanotube array 24. The adhesive can partially cover the side surface, or entirely cover the side surface. In one embodiment, the rigid drawing device 26 can include a plurality of planar adhesive regions 28 located on different side surfaces, or a signal side surface of the rigid drawing device 26. A shape of the planar adhesive region 28 is arbitrary except having a linear boarder 282. In one embodiment, the planar adhesive region 28 is a rectangle with four linear borders 282. In other embodiment, the planar adhesive region 28 is a polygon with irregular boarders and has at least a linear border 282. The length of the linear border 282 of the planar adhesive region 28 can be chosen according to the width of the desired carbon nanotube film 30.

Figure 4:
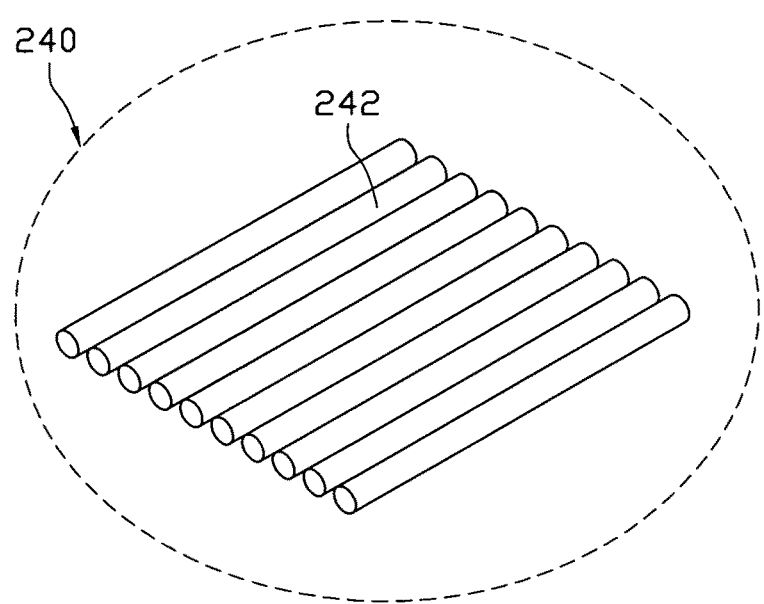
FIG. 4 is a structural schematic view of a carbon nanotube segment in the carbon nanotube film.

In step (b), Referring to FIG. 4, in the carbon nanotube array 24, a carbon nanotube segment 240 can be adhered to the rigid drawing device 26 via the planar adhesive region 28. The carbon nanotube segment 240 includes a plurality of carbon nanotubes 242 approximately parallel to each other, and combined by van der Waals attractive force therebetween. The carbon nanotube segments 240 can vary in width, thickness, uniformity, and shape. The carbon nanotubes 242 in the carbon nanotube segments 240 are oriented along a preferred orientation. The linear border 282 of the planar adhesive region 28 is the closest border of the planar adhesive region 28 to the substrate 22 when an angle between the planar adhesive region 28 and the length direction of the carbon nanotubes 242 is less than 90 degrees. Additionally, the planar adhesive region 28 can also be perpendicular to the length direction of the carbon nanotubes 242, namely, the planar adhesive region 28 can be parallel to the substrate 22. In one embodiment, during the steps (b) and (c), the linear border 282 is spaced apart from the substrate 22 to avoid any impurities of the substrate 22 being absorbed on the drawn carbon nanotube film 30, thereby improving the quality of the carbon nanotube film 30. Furthermore, the rigid drawing device 26 can pull out a plurality of carbon nanotube films 30 when the rigid drawing device 26 includes a plurality of planar adhesive regions 28 located on different surfaces of the rigid drawing device 26. Additional, the rigid drawing device 26 can pull out a plurality of carbon nanotube films 30 at one time when the rigid drawing device 26 includes a plurality of planar adhesive regions 28 located on a single surface of the rigid drawing device 26.

In the carbon nanotube array, the carbon nanotube segments 240 are joined to each other by van der Waals attractive force therebetween. In step (c), the carbon nanotube segment 240 that is adhered to the adhesive is pulled away from the substrate 22, and a subsequent carbon nanotube segment adjacent to the pulled carbon nanotube segment 240 is also pulled away from the substrate 22 due to the van der Waals attractive force between the pulled carbon nanotube segment 240 and the subsequent carbon nanotube segment. Thus, the carbon nanotubes 242 of the entire carbon nanotube array 24 can be pulled out from the substrate 22 end-to-end continuously. The carbon nanotubes 242 pulled away from the substrate 22 is joined end-to-end by van der Waals attractive force therebetween. Thus a continuous carbon nanotube film 30 can be acquired. The carbon nanotube film 30 includes a plurality of carbon nanotube segments 240 joined end-to-end by van der Waals attractive force. The carbon nanotube segments 240 are uniformly distributed in the carbon nanotube film 30 and substantially aligned along the same direction. The pulling speed of the rigid drawing device 26 can be from about 1 millimeter per second (mm/s) to about 100 mm/s. In one embodiment, the pulling speed of the rigid drawing device 26 is about 10 mm/s.

In the process of drawing the carbon nanotube film 30, a boundary 32 between the carbon nanotube array 24 and the carbon nanotube film 30 is formed. The boundary 32 moves at a speed, because the carbon nanotubes 242 in the carbon nanotube array 24 are gradually pulled away from the substrate 22 to form the carbon nanotube film 30. In one embodiment, the boundary 32 is a straight line. The boundary 32 gradually moves along a direction perpendicular to the boundary 32 and opposite to the pulling direction of the rigid drawing device 26.

By pulling the rigid drawing device 26, the carbon nanotubes 242 adhered by the planar adhesive region 28 are pulled away from the substrate 22 at a same time. The planar adhesive region 28 is disposed on the side surface of the rigid drawing device 26 which is made of the rigid material, thus, a flat contact surface can be formed between the carbon nanotube array 24 and the planar adhesive region 28, and the planar adhesive region 28 can firmly adhere the carbon nanotubes 242 of the carbon nanotube segment 240 adhered by the planar adhesive region 28 in the carbon nanotube array 24. Additionally, the carbon nanotubes 242 can be adhered by the linear border 282 of the planar adhesive region 28 in a straight line, thus, the adhered portion of the carbon nanotubes 242 are adhered at an equal distance from the substrate. Meanwhile, the adhered carbon nanotubes in a straight line can be firstly pulled out from the substrate 22 and join in the pulling process, because the linear border 282 is the closest border of the planar adhesive region 28 to the substrate 22. Therefore, the carbon nanotubes 242 in the straight line can be simultaneously pulled away from the substrate 22 and join in the pulling process. Thus, a discontinuous spot can be better prevented from forming in the carbon nanotube array, thereby forming the straight boundary between the carbon nanotube array 24 and the carbon nanotube film 30. Furthermore, a gap in the carbon nanotube film 30 induced by the discontinuous spot can be avoided. Thus, a more uniform and continuous carbon nanotube film 30 can be formed.

The discontinuous spot can also be induced by impurity such as a catalyst particle, an amorphous carbon or a dust that existed in the carbon nanotube array by interfering with the van der Walls forces. When the impurity exists in the carbon nanotube array 24, a gap can form in the carbon nanotube film 30. In one embodiment, a condition of the method for making the carbon nanotube film 30 is satisfied with the following demands.

(I) The carbon nanotube array 24 is disposed in a clean room, the air cleanliness class of the clean room is greater than 100000 class. In one embodiment, the air cleanliness class of the clean room is greater than 10000 class.

(II) the angle between the pulling direction of the drawing device 26 and a top surface of the substrate 22 can range from above 0 degrees to about 50 degrees. In one embodiment, the angle ranges from above 0 degrees to 5 degrees. The substrate 22 may have some impurities such as catalyst or amorphous carbon thereon. When the angle is 0 degrees, the carbon nanotube film 30 can be easily in contact with the substrate 22, and the impurities on the substrate 22 can be absorbed to the carbon nanotube film 30, thereby decreasing the quality of the carbon nanotube film 30. When the angle is too great, the van der Waals attractive force between the carbon nanotube segment 240 firstly pulled away from the substrate 22, and the subsequent carbon nanotube segment adjacent to the pulled carbon nanotube segment 240 can be decreased, thus there is a poor adhesion between the carbon nanotubes, and the carbon nanotube film can be damaged easily.

Referring to FIG. 3, in one embodiment, when a gap induced by the discontinuous spot 244 in the carbon nanotube array 24 has been appeared in the carbon nanotube film, the carbon nanotube film with the gap can be removed, and a new carbon nanotube film can be drawn by the following steps:

(c1) providing a cutting device (not shown);

(c2) removing the discontinuous carbon nanotube film from the boundary between the carbon nanotube film 30 and carbon nanotube array 24 by using the cutting device;

(c3) adhering the carbon nanotube array 24 to the planar adhesive region 28.

(c4) pulling the rigid drawing device 26 at a speed along a direction away from the substrate 22, thereby pulling out a continuous carbon nanotube film 30 from the carbon nanotube array 24.

In step (c1), the cutting device can be the rigid drawing device 26.

Additionally, the position of the discontinuous spot 244 corresponds to the position of the gap in the carbon nanotube film. To avoid the discontinuous spot 244, in the beginning of the step (c4), the pulling direction of the rigid drawing device 26 faces to the discontinuous spot 244. During the pulling process of the rigid drawing device 26, the boundary 32 between the carbon nanotube array 24 and the carbon nanotube film 30 gradually moves along a direction away from the discontinuous spot 244. Namely, at the beginning of movement of the drawing device 26, the movement direction of the drawing device 26 faces to the discontinuous spot 244, to prevent the carbon nanotubes of the discontinuous spot 244 joining in the pulling process. In one embodiment, the discontinuous spot 244 is removed, and the step (b) and step (c) can be repeated to acquire the continuous carbon nanotube film 30.

Figure 5:
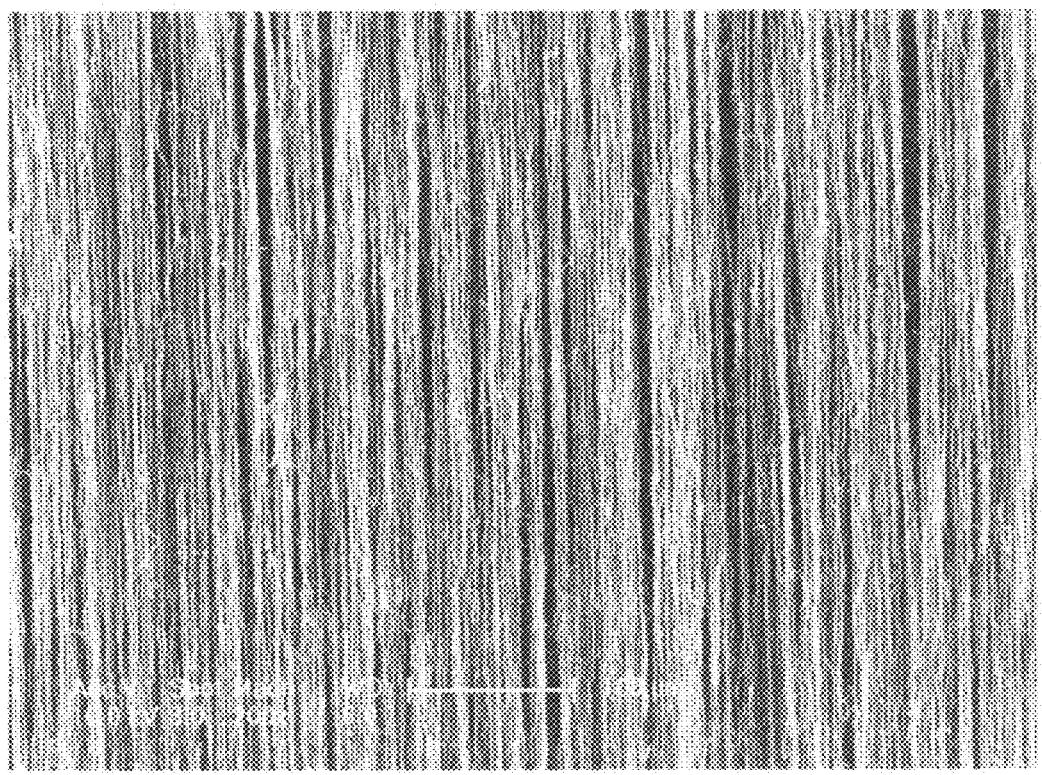
FIG. 5 shows a Scanning Electron Microscope (SEM) image of the carbon nanotube film.
Figure 6:
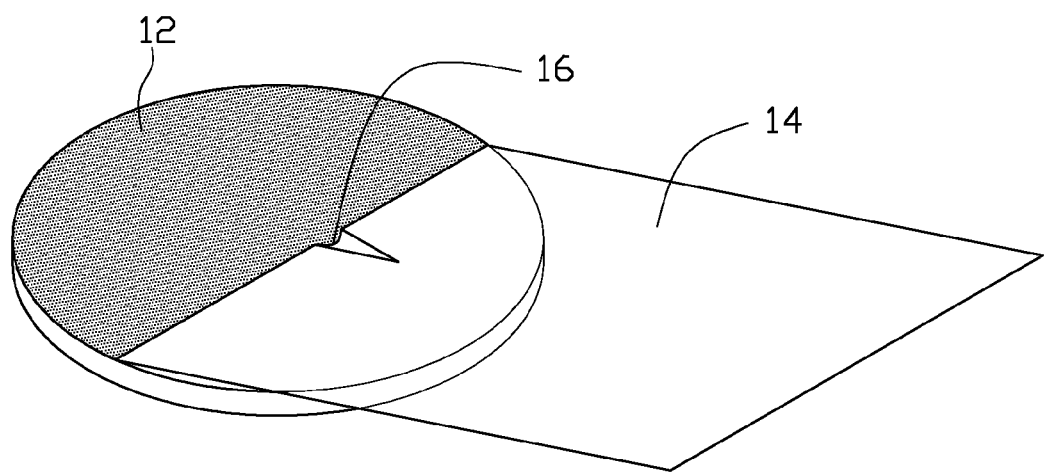
FIG. 6 is a schematic view of a carbon nanotube array having a discontinuous spot formed during making a carbon nanotube film using a conventional method.

Referring to FIGS. 4 and 5, in one embodiment, the carbon nanotube film 30 includes a plurality of successively oriented carbon nanotube segments 240 joined end-to-end by van der Waals attractive force therebetween. The carbon nanotubes 242 of the carbon nanotube segment 240 are substantially aligned along the movement direction of the drawing device 26.

The maximum width and length of the carbon nanotube film 30 is related to the size of the carbon nanotube array 24. In one embodiment, the diameter of the carbon nanotube array 24 is four inch, and the width of the carbon nanotube film 30 can range from about 0.01 centimeters (cm) to about 10 cm, the thickness of the carbon nanotube film can range from about 0.5 nm to about 200 microns.

The carbon nanotube film 30 acquired by using the above method is more transparent than a disorderly aligned carbon nanotube, and the uniformity of the thickness of the carbon nanotube film 30 is better. Light transmittance of the carbon nanotube film 30 can achieve 90 percent. Furthermore, the method for making the carbon nanotube film 30 is simple.

In one embodiment, the carbon nanotube array 24 is a super-aligned carbon nanotube array 24, the carbon nanotubes 242 in the carbon nanotube array 24 is pure, and specific surface area of the carbon nanotubes 242 is great. Thus, the carbon nanotube film 30 has a strong adhesion, and the carbon nanotube film 30 can be adhered on a surface of an object by the adhesion thereof according to demand.

In other embodiment, the carbon nanotube film 30 adhered on the object can be treated with an organic solvent. Applying the organic solvent onto the entire surface of the carbon nanotube film 30. The organic solvent is volatilizable and can be ethanol, methanol, acetone, dichloroethane, chloroform, or combinations thereof. After being soaked by the organic solvent, the carbon nanotube film will more firmly adhere to the surface of the object due to the surface tension created by the volatilization of the organic solvent, the specific surface area and the adhesion of the carbon nanotube film 30 decrease, and the mechanical strength and toughness of the carbon nanotube film 30 will increase.

Furthermore, a plurality of carbon nanotube films 30 can be made by using the above method. The carbon nanotube films 30 can also be stacked one upon another. The carbon nanotubes in two adjacent carbon nanotube films 30 can be aligned along a same direction or different directions. The carbon nanotube film 30 and the film structure can have a good conductivity and a high light transmittance. Thus, the carbon nanotube film 30 and the film structure can be used as a transparent conductive film applied to a field such as touch panel, liquid crystal display, or light emitting diode.

In the method for making the carbon nanotube film 30, the carbon nanotubes adhered to the planar adhesive region 28 of the rigid drawing device 26 can be simultaneously pulled out from the substrate 22, thereby avoiding an appearance of a discontinuous spot in the carbon nanotube array 24, thus a continuous carbon nanotube film without a gap can be acquired. The angle between the pulling direction of the rigid drawing device 26 and the surface of substrate 22 can range from about 0 degrees to about 50 degrees. Therefore, the pulled carbon nanotube film 30 can be pulled gradually away from the substrate 22, thereby avoiding the impurities of the surface of the substrate 22 being absorbed on the carbon nanotube film 30 being formed. Thus, a gap is prevented from forming in the carbon nanotube film 30 because the absorption of the impurity can be avoided. The rigid drawing device 26 can avoid the discontinuous spot 244, and can include a plurality of planar adhesive regions 28 to repeatedly pull out carbon nanotube film 30 from carbon nanotube arrays.

It is to be understood that the above-described embodiments are intended to illustrate rather than limit the disclosure. Variations may be made to the embodiments without departing from the spirit of the invention as claimed. The above-described embodiments illustrate the scope of the invention but do not restrict the scope of the invention.

Depending on the embodiment, certain of the steps described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for making a carbon nanotube film, comprising:

providing a carbon nanotube array grown on a top surface of a substrate and a rigid drawing device, the carbon nanotube array comprising a plurality of carbon nanotubes, and the rigid drawing device comprising at least one adhesive plane;

adhering the at least one adhesive plane to the carbon nanotube array, wherein a border of the at least one adhesive plane closest to the substrate is a straight border;

positioning the rigid drawing device so that the at least one adhesive plane is substantially perpendicular to the top surface of the substrate and in contact with the carbon nanotube array;

positioning the rigid drawing device so that the straight border is parallel to the top surface of the substrate, and so that the straight border is between the top surface and an end of the plurality of carbon nanotubes and in contact with the carbon nanotube array, but not in contact with the substrate before pulling the rigid drawing device; and pulling the rigid drawing device at a speed along a direction away from the substrate, thereby pulling out at least one continuous carbon nanotube film.

2. The method as claimed in claim 1, wherein a pulling speed of the rigid drawing device ranges from about 1 millimeter per second to about 100 millimeters per second.

3. The method as claimed in claim 1, wherein an angle between the direction of the pulling of the rigid drawing device and the top surface of the substrate is in a range from 0 degrees to about 50 degrees.

4. The method as claimed in claim 1, wherein the carbon nanotube array is disposed in a clean room, and air cleanliness class of the clean room is greater than 100000 class.

5. The method as claimed in claim 1, wherein a boundary between the at least one carbon nanotube film and the carbon nanotube array is formed during pulling the at least one carbon nanotube film.

6. The method as claimed in claim 5, wherein the boundary is a straight line.

7. The method as claimed in claim 6, wherein when the carbon nanotube array comprises a discontinuous spot, the discontinuous spot is avoided by the at least one adhesive plane, and the boundary between the at least one carbon nanotube film and the carbon nanotube array moves along a direction deviating from the discontinuous spot, the discontinuous spot is an inflexion which appears in boundary of the carbon nanotube array.

8. The method as claimed 1, wherein the rigid drawing device is made of a rigid material selected from the group consisting of iron, steel, glass, ceramics, and rigid plastic.

9. The method as claimed 1, wherein the plurality of carbon nanotubes are substantially parallel to each other and combined by van der Waals attractive force.

10. The method as claimed 1, wherein adhered portions of the plurality of carbon nanotubes are pulled away from the top surface of the substrate at a same time.

11. The method as claimed 1, wherein the at least one adhesive plane is rectangular.

12. The method as claimed 1, wherein an angle between the direction of the pulling of the rigid drawing device and the top surface of the substrate is greater than 0 degrees and less than or equal to about 50 degrees.

13. The method as claimed 1, wherein the rigid drawing device comprises a plurality of the adhesive planes located on different side surfaces, or on a single side surface.

14. The method as claimed 13, wherein a plurality of the carbon nanotube films are pulled out from the carbon nanotube array using the plurality of the adhesive planes.

15. The method as claimed 1, wherein a pulling speed of the rigid drawing device ranges from about 1 millimeter per second to about 10 millimeters per second.

* * * * *